(12) United States Patent
Yamamoto

(10) Patent No.: US 7,764,313 B2
(45) Date of Patent: Jul. 27, 2010

(54) IMAGE CAPTURING DEVICE FOR DISPLAYING AN ORANAMENTAL IMAGE AS SEMI-TRANSPARENT AND WITH OPACITY

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 274 days.

(21) Appl. No.: 11/782,226

(22) Filed: Jul. 24, 2007

(65) Prior Publication Data
US 2008/0024508 A1 Jan. 31, 2008

(30) Foreign Application Priority Data
Jul. 26, 2006 (JP) .............................. 2006-202927

(51) Int. Cl.
*H04N 5/272* (2006.01)
*H04N 5/225* (2006.01)
(52) U.S. Cl. .................................. 348/239; 348/333.11
(58) Field of Classification Search ................ 348/239, 348/333.01, 333.02, 333.11, 345, 346
See application file for complete search history.

(56) References Cited

U.S. PATENT DOCUMENTS

| 6,963,359 | B1* | 11/2005 | Aosaki et al. ........... 348/333.01 |
| 2002/0024603 | A1* | 2/2002 | Nakayama et al. ..... 348/333.12 |
| 2002/0051238 | A1 | 5/2002 | Yamamoto |
| 2002/0071042 | A1* | 6/2002 | Enomoto .................... 348/222 |
| 2004/0160521 | A1 | 8/2004 | Yamamoto |
| 2006/0001747 | A1 | 1/2006 | Yamamoto |
| 2006/0001929 | A1 | 1/2006 | Yamamoto |
| 2006/0092306 | A1* | 5/2006 | Kim ....................... 348/333.01 |
| 2007/0064112 | A1* | 3/2007 | Chatting et al. ......... 348/207.99 |
| 2007/0177036 | A1* | 8/2007 | Kawada ...................... 348/239 |
| 2007/0195170 | A1 | 8/2007 | Yamamoto et al. |
| 2007/0196083 | A1 | 8/2007 | Yamamoto et al. |
| 2008/0309811 | A1* | 12/2008 | Fujinawa et al. ........ 348/333.01 |

FOREIGN PATENT DOCUMENTS
JP 2002290779 10/2002
JP 2004312162 11/2004

OTHER PUBLICATIONS

English language Abstract of JP 2004-312162.
U.S. Appl. No. 11/782,269 to Yamamoto, filed Jul. 24, 2007.
U.S. Appl. No. 11/782,248 to Yamamoto, filed Jul. 24, 2007.
English language Abstract of JP 2002-290779.

* cited by examiner

*Primary Examiner*—Jason Whipkey
(74) *Attorney, Agent, or Firm*—Greenblum & Bernstein P.L.C.

(57) ABSTRACT

An image capturing apparatus is provided having an auto-focusing device and an image displaying device. The auto-focusing device focuses a lens on a photographing object automatically. The image displaying device displays an input image which corresponds to the photographing object and is updated periodically in a display, and displays an ornament image which covers all or part of the circumference of the input image in the display. The image displaying device displays the parts of the input image superimposed by the ornament image before said auto-focusing device finishes focusing the lens on a photographing object due to the ornament image semi-transparency, and displays the ornament image superimposed with opaque on parts of the input image after said auto-focusing device has focused the lens on a photographing object.

9 Claims, 4 Drawing Sheets

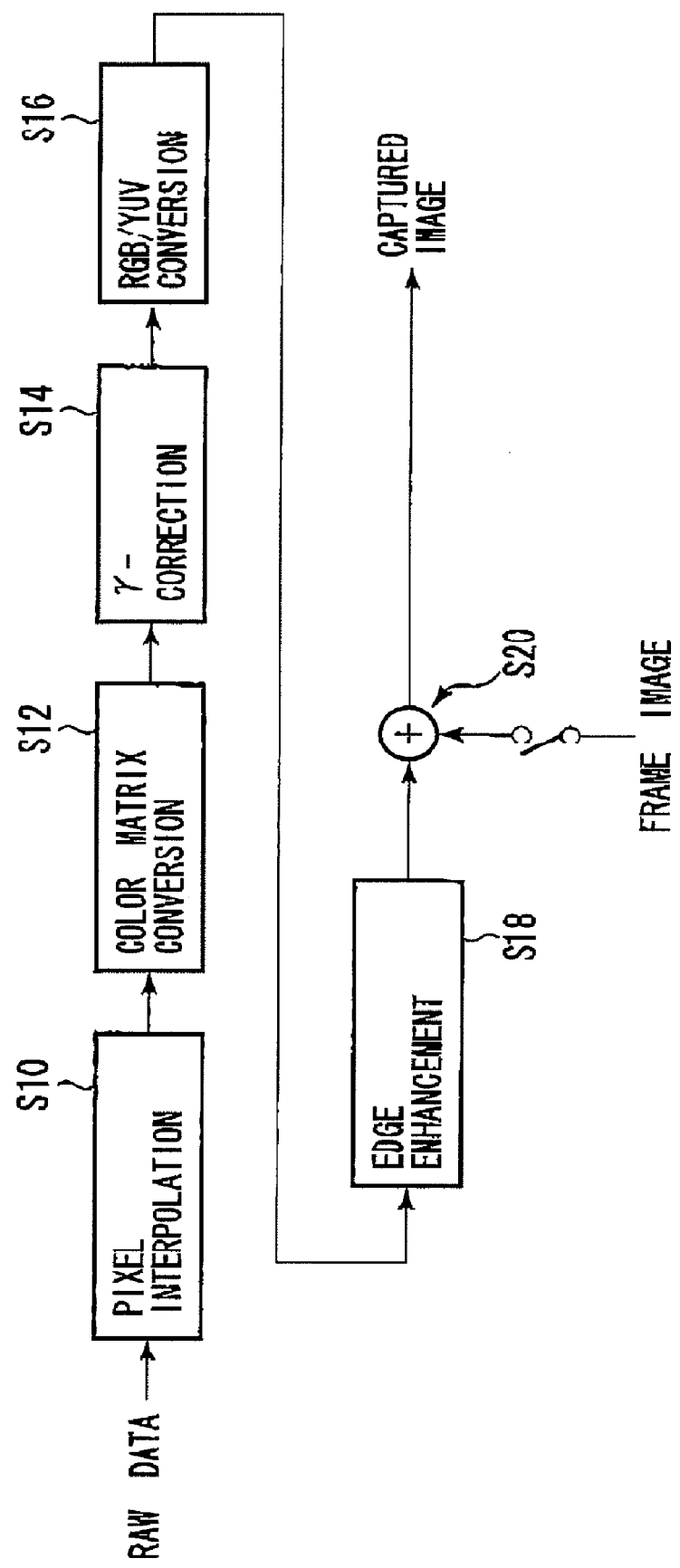

IMAGE CAPTURING DEVICE FOR DISPLAYING AN ORANAMENTAL IMAGE AS SEMI-TRANSPARENT AND WITH OPACITY

BACKGROUND OF THE INVENTION

1. Field of the Invention

The present invention relates to an image capturing apparatus, and particularly to an image storing apparatus having a display.

2. Description of the Related Art

An image capturing apparatus, e.g. a digital camera, captures an object image through a lens, with an image sensor, and displays the captured image on a display. The image is updated periodically so that a moving image is shown on the display.

Some digital cameras superimpose a still image onto the outer edge of a captured image as a form of ornament. The ornament image is displayed on the display in front of the moving image before photographing. A user photographs an object after adjusting the spatial relationship between the ornament image and the object image on the display, and obtains a composite image onto which the ornament image is superimposed. When a user adjusts the spatial relationship between the ornament image and the photographing object on the display, the ornament image is placed on top of the moving image so that a portion of the moving image is covered by the ornament image. Therefore, a user is unable to see a portion of the moving image, and it is difficult for a user to judge the spatial relationship between the ornament image and the photographing object on the display. To resolve this problem, a digital camera which semi-transparently superimposes the ornament image onto a display before photographing is disclosed in Japanese Unexamined Patent Publication (KOKAI) No. 2004-312162.

SUMMARY OF THE INVENTION

An object of the present invention is to provide an image capturing apparatus, using which a user is able to adjust the spatial relationship between an ornament image and a photographing object on a display, and predict easily the composite image created by a process where an ornament image is superimposed onto an object image.

An image capturing apparatus is provided having an image displaying device and an auto-focusing device. The auto-focusing device focuses a lens on a photographing object automatically. The image displaying device displays an input image which corresponds to the photographing object and is updated periodically in a display, and displays an ornament image which covers all or part of the circumference of the input image in the display. The image displaying device displaying the parts of the input image superimposed by the ornament image before said auto-focusing device finishes focusing the lens on a photographing object due to the ornament image semi-transparency, and displaying the ornament image superimposed with opaque on parts of the input image after said auto-focusing device has focused the lens on a photographing object.

BRIEF DESCRIPTION OF THE DRAWINGS

The objects and advantages of the present invention will be better understood from the following description, with reference to the accompanying drawings in which:

FIG. 1 is a block diagram showing a digital camera as an embodiment of the present invention;

DESCRIPTION OF THE PREFERRED EMBODIMENTS

Figure 2A:
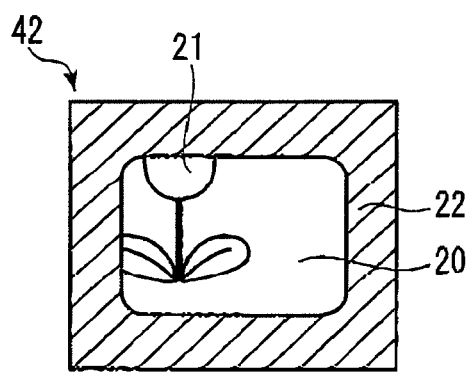
FIG. 2A shown a display provided in a digital camera.

The present invention is described below with reference to the embodiments shown in the drawings.

The constitution of a digital camera having image capturing apparatus is described with reference to FIG. 1.

A digital camera converts an object image into a digital signal using a CCD. The digital signal is input into a DSP and converted into raw data. The DSP processes the raw data using a pixel interpolation process in step S10; a color matrix conversion process in step S12; a gamma correction process in step S14; a RGB/YUV conversion process in step S16; an edge enhancement process in step S18; and finally outputs a captured image. In step S20, an ornament image, e.g. an image of a flame, is superimposed onto the image data by choice of a user.

As an example, a frame image may be displayed continuously around the whole circumference of a captured image. For example, the ornament image could be a picture frame or a window frame. Alternatively, some ornament images could be displayed on part of the circumference of the captured image, e.g. an upper area, lower area, left area, right area, and/or corner area of the captured image. An example could be flowers superimposed onto all corners of a captured image.

The ornament image and the captured image are described with reference to FIG. 2.

FIG. 2A shows a display 42 in which an ornament image is displayed opaquely (i.e. non-transparently). When a user selects an ornament image to be superimposed onto a captured image using the selecting process described below, the captured image and the ornament image 22 are simultaneously displayed on the display 42. The ornament image 22 is displayed around the whole circumference of the captured image 20. If the area of the superimposed ornament image 22 becomes larger, the area of the captured image visible in the inner area of the ornament image 22 becomes smaller. The part of the captured image covered by the ornament image 22 is not displayed because the ornament image 22 in not transparent. Therefore, it in difficult for a user to judge the spatial relationship between the ornament image 22 and the photographing object 21 in a display.

Figure 2B:
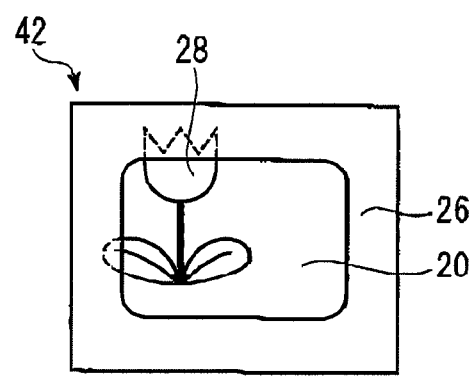
FIG. 2B shows a display provided in a digital camera.

FIG. 2B shows a display 42 in which an ornament image 26 is displayed semi-transparently. Because the ornament image 26 is displayed semi-transparently, a user can easily see the captured image 20 and the photographing object 28, and can easily judge, and adjust, the spatial relationship between them.

Figure 3:
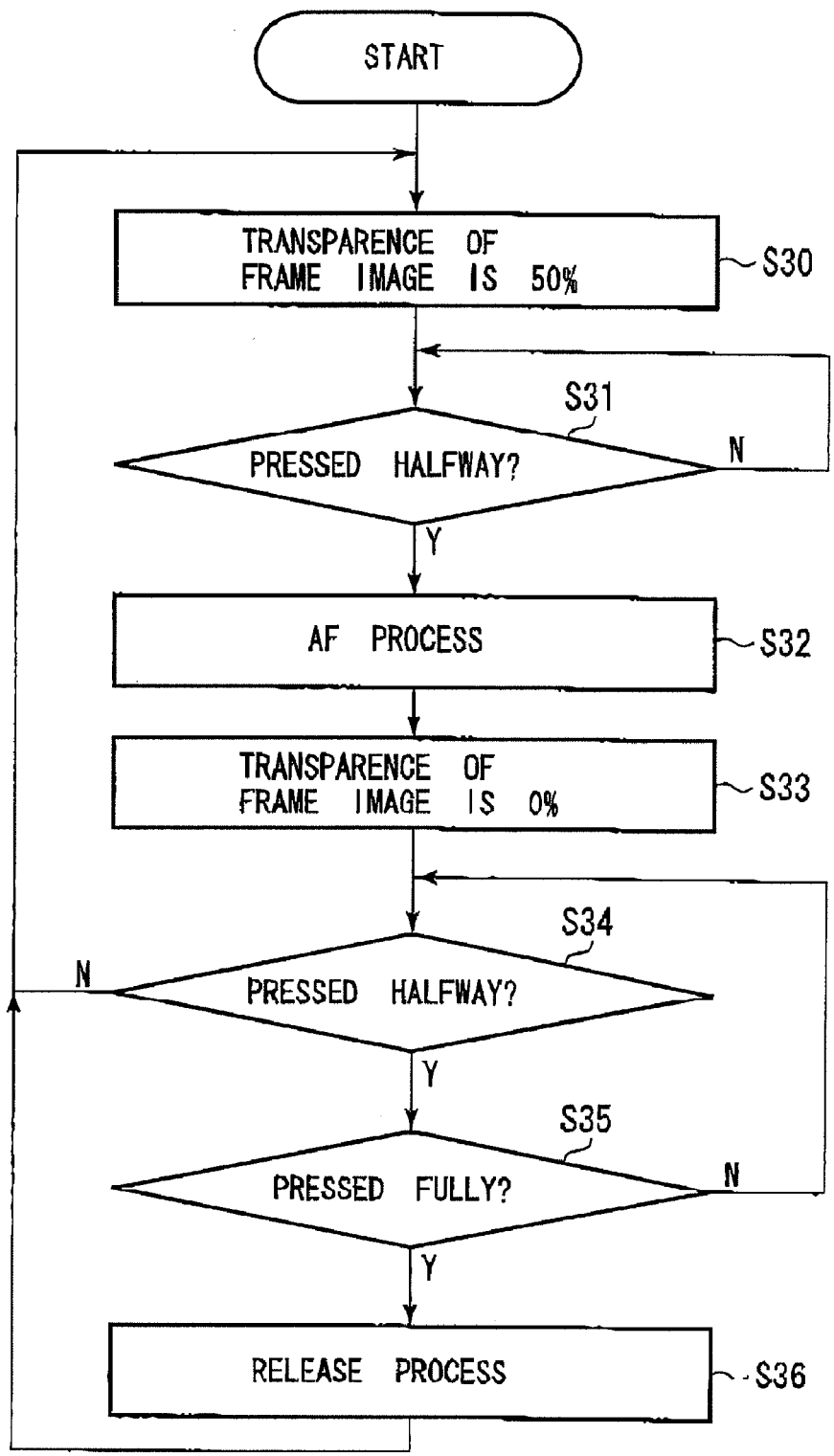
FIG. 3 is a flowchart showing the transparent display process.

The transparent display process is described below with reference to FIG. 3.

When a user selects that an ornament image is to be superimposed onto a captured image 20 using the selecting process described below, the semi-transparent display process begins. In step S30, an ornament image is displayed in the display 42 superimposed on the captured image 20. At this point, the transparence of the ornament image is 50% (half-transparence). In step S31, it is judged whether the release button is pressed halfway or not. In the case that the release button is pressed halfway, the lens is automatically focused onto a photographing object in step S32.

After the lens is automatically focused onto the photographing object, the captured image 20, whose exposure is adjusted, and which is in focus, is displayed in the display 42. In step S33, the transparence of the ornament image is changed to 0% (opaque or non-transparence), so that a part of the captured image 20 is covered fully by the ornament image and a user can recognize clearly the photographing object to be photographed which is not covered by the ornament image. Therefore, the image which a user intends to photograph with the ornament image is displayed in the display 42, and a user can easily predict the photographed image. In step S34, it is judged whether the release button is pressed halfway or not. In the case that the release button is pressed half way, it is judged whether the release button is pressed fully or not in step S35. In the case that the release button is pressed fully, a release process is executed, so that a photographed image is captured and stored in memory in step S36.

According to this process, a user can easily judge the positioning of the superimposed ornament image in relation to the photographing object in the display, but is able to easily predict the captured image.

Figure 4:
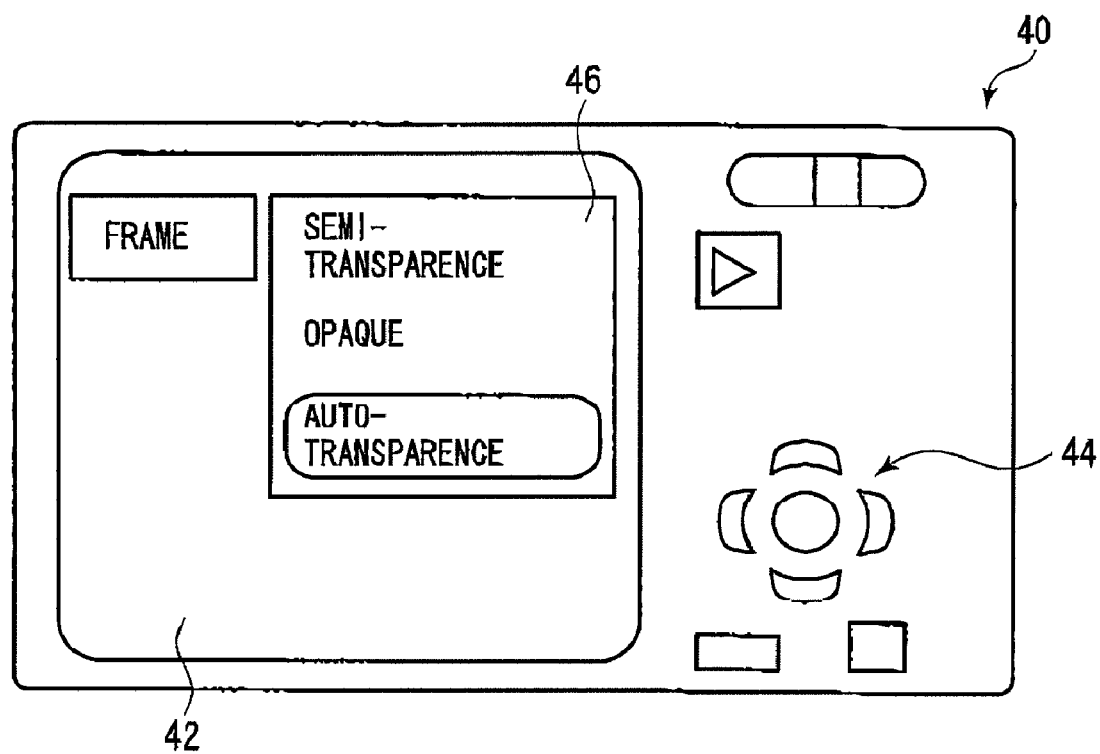
FIG. 4 shows the back view of a digital camera.

The selecting process is described below with reference to FIG. 4.

A user is able to select the timing by which the transparence of an ornament image is changed. When a user operates the operating button 44, a dialog 46 which is provided for selecting the timing is displayed in the display 42. A user can select any one from half-transparence, non-transparence, or auto-transparence. If a user selects half-transparence, the ornament image is always displayed with half-transparence while it is visible in the display 42, and is not displayed with non-transparence even if the auto-focus process is executed. If a user selects non-transparence, the ornament image is always displayed with non-transparence while it is visible in the display 42. In this case, a user cannot see the part of the captured image 20 superimposed by the ornament image, but can easily see the ornament image. If a user selects auto-transparence, the ornament image is displayed with half-transparence before the auto-focus process is executed. After the auto-focus process is executed, the ornament image is displayed with opaque (i.e. non-transparence).

According to the known art, it is difficult for a user to see an ornament image, and predict the position of a superimposed ornament image on an object image because the ornament image is always displayed semi-transparently in the display before photographing. According to this embodiment, a user is able to judge and adjust the spatial relationship between the ornament image and a photographing object, and predict easily the composite image of an object image and a superimposed ornament image. Moreover, a user is able to select whether the ornament image is displayed transparently on a captured image, and the convenience of a digital camera is increased.

Note that, the transparence of the ornament image may be any value of transparence in order that a user can recognize the part of a captured image covered by an ornament image.

In the dialog 46, any value of transparence for an ornament image may be displayed. A user is able to decide the value of the transparence according to preference, and easily recognize the part of a captured image covered by an ornament image.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2006-202927 (filed on Jul. 26, 2006), which is expressly incorporated herein, by reference, in its entirety.

The invention claimed is:

1. An image capturing apparatus, comprising:
   an auto-focusing device that automatically focuses a lens on a photographing object; and
   an image displaying device that displays, in a display, an input image which corresponds to the photographing object and is updated periodically, and displays an ornamental image which is superimposed on all or part of the circumference of the input image in the display,
   said image displaying device displaying the parts of the input image superimposed with the ornamental image with semi-transparency before said auto-focusing device finishes focusing the lens on a photographing object and displaying the ornamental image superimposed with opacity on parts of the input image after said auto-focusing device has focused the lens on the photographing object, and
   wherein the ornamental image superimposed with opacity after said auto-focusing device has focused the lens on the photographing object is identical to a subsequently captured image stored in memory.

2. The image capturing apparatus according to claim 1, wherein said image displaying device is provided so that a user is able to select whether or not the ornamental image conceals the parts of the input image superimposed with the ornamental image.

3. The image capturing apparatus according to claim 1, further comprising changing the transparency of the ornamental image with semi-transparency to 0% transparency to obtain the ornamental image displayed with opacity.

4. The image capturing apparatus according to claim 1, wherein the ornamental image is displayed with semi-transparency upon actuation of a shutter button and is displayed with opacity in response to completion of the automatic focusing.

5. A digital camera comprises the image capturing apparatus according to claim 1.

6. An image capturing apparatus comprising:
   an auto-focusing device that automatically focuses a lens on a photographing object; and
   an image displaying device that displays, in a display, an input image which corresponds to the photographing object and is updated periodically, and displays an ornamental image which is superimposed on all or part of the circumference of the input image in the display;
   said image displaying device displaying the parts of the input image superimposed with the ornamental image with semi-transparency before said auto-focusing device finishes focusing the lens on a photographing object and displaying the ornamental image superimposed with opacity on parts of the input image after said auto-focusing device has focused the lens on the photographing object,
   wherein the ornamental image is displayed with semi-transparency upon actuation of a shutter button and is displayed with opacity in response to completion of the automatic focusing, and
   wherein the ornamental image displayed with opacity is identical to a captured image stored in memory immediately after the shutter button is depressed.

7. The image capturing apparatus according to claim 6, wherein said image displaying device is provided so that a user is able to select whether or not the ornamental image conceals the parts of the input image superimposed with the ornamental image.

8. The image capturing apparatus according to claim 6, further comprising changing the transparency of the ornamental image having semi-transparency to 0% transparency to obtain the ornamental image displayed with opacity.

9. A digital camera comprises the image capturing apparatus according to claim 6.

* * * * *